United States Patent
Bhatia et al.

(10) Patent No.: US 9,247,523 B1
(45) Date of Patent: Jan. 26, 2016

(54) SYSTEM, METHOD AND DEVICE FOR INITIATING ACTIONS FOR MOBILE DEVICES PRIOR TO A MOBILE USER ENTERING PROBLEM ZONES

(71) Applicant: Cox Communications, Inc., Atlanta, GA (US)

(72) Inventors: Lalit Tulsidas Bhatia, Alpharetta, GA (US); Michael Lee Poffenberger, Atlanta, GA (US); Douglas David Gravino, Roswell, GA (US); Radhakrishnan Gopinath, Alpharetta, GA (US)

(73) Assignee: Cox Communications, Inc., Atlanta, GA (US)

( * ) Notice: Subject to any disclaimer, the term of this patent is extended or adjusted under 35 U.S.C. 154(b) by 0 days.

(21) Appl. No.: 13/831,643

(22) Filed: Mar. 15, 2013

Related U.S. Application Data

(63) Continuation-in-part of application No. 13/351,359, filed on Jan. 17, 2012, now abandoned.

(51) Int. Cl.
| | |
|---|---|
| *H04W 24/00* | (2009.01) |
| *G06F 15/173* | (2006.01) |
| *H04W 64/00* | (2009.01) |
| *H04W 4/02* | (2009.01) |

(52) U.S. Cl.
CPC .............. *H04W 64/006* (2013.01); *H04W 4/02* (2013.01)

(58) Field of Classification Search
CPC .......... H04W 36/0016; H04B 17/0057; G06F 17/30902
USPC .......... 455/456.5, 414.1–414.3, 422.1, 432.1, 455/452.2; 707/1
See application file for complete search history.

(56) References Cited

U.S. PATENT DOCUMENTS

| | | | |
|---|---|---|---|
| 6,349,206 B1 * | 2/2002 | Reichelt et al. ................ | 455/421 |
| 6,597,906 B1 * | 7/2003 | Van Leeuwen et al. ... | 455/422.1 |
| 7,203,487 B2 * | 4/2007 | Comp ......................... | 455/422.1 |
| 7,359,706 B2 | 4/2008 | Zhao | |
| 7,630,707 B2 | 12/2009 | Lee et al. | |
| 7,668,536 B2 * | 2/2010 | Hull et al. ................... | 455/414.1 |
| 8,150,406 B1 * | 4/2012 | Crandall et al. ........... | 455/452.2 |
| 2003/0040331 A1 | 2/2003 | Zhao | |
| 2004/0203670 A1 | 10/2004 | King et al. | |
| 2006/0248183 A1 * | 11/2006 | Barton .......................... | 709/224 |
| 2009/0006308 A1 | 1/2009 | Fonsen | |
| 2011/0081895 A1 * | 4/2011 | Ohashi ....................... | 455/414.1 |

* cited by examiner

*Primary Examiner* — William Nealon
(74) *Attorney, Agent, or Firm* — Merchant & Gould P.C.

(57) ABSTRACT

Initiating actions for mobile devices prior to a mobile user entering problem zones. A position and a route of a user are identified. A database is accessed to retrieve data identifying problem zones in a communications network. The position and route of the user are compared to the retrieve data identifying problem zones. A determination is made to identify when the user is approaching a problem zones. An action is performed to compensate for unfavorable network conditions of the problem zone when the user enters the problem zone.

19 Claims, 5 Drawing Sheets

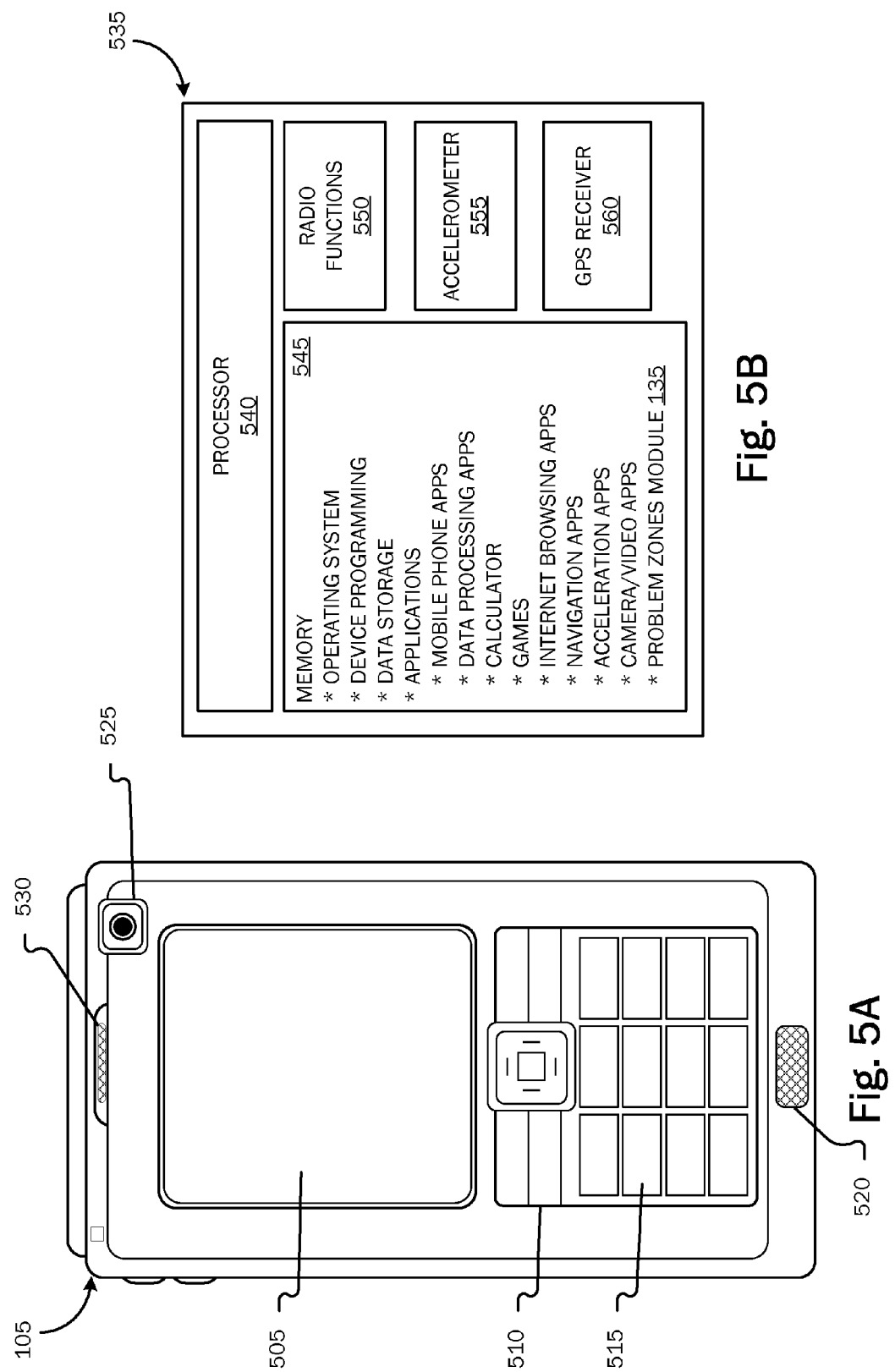

SYSTEM, METHOD AND DEVICE FOR INITIATING ACTIONS FOR MOBILE DEVICES PRIOR TO A MOBILE USER ENTERING PROBLEM ZONES

CROSS-REFERENCE TO RELATED APPLICATIONS

This is a continuation-in-part application of U.S. patent application Ser. No. 13/351,359 filed Jan. 17, 2012, and titled "System, Method and Device for Initiating Actions for Mobile Devices Prior to a Mobile User Entering Problem Zones," the disclosure of which is expressly incorporated herein, in its entirety, by reference.

FIELD OF THE INVENTION

This disclosure relates in general to streaming data to mobile devices and more particularly to providing uninterrupted service due by initiating actions for mobile devices prior to entering problem zones.

BACKGROUND

Consumers are using mobile devices more frequently for streaming media such as audio or video or fetching other useful data such as maps, etc. while in motion. One common limitation, though, when using mobile devices in this manner is that wireless "dead zones" (zones where there is not sufficient wireless signal strength or bandwidth) cause an interruption in streaming-type services. In addition, driving from areas with less network congestion (for example, the suburbs) to areas of greater network congestion (e.g. urban centers) may also cause an interruption in streaming content due to the over-congested networks. Other examples of reception limitations involve situations where interference with other cell sites occurs or where the radio signal is interrupted or attenuated by local topography. Since cell phones rely on radio waves, and radio waves travel through the air and are easily attenuated, other factors may cause cell phones to be unreliable at times. Areas that exhibit such limitations may commonly be referred to as problem zones that represent areas of unfavorable network conditions.

Streaming applications require uninterrupted playback that is isolated from the vagaries of network jitter, interference or signal loss/attenuation. Thus, the above-mentioned problem zones can cause an interruption in streaming data. Many application programmers or mobile device manufacturers try to compensate for problem zones by "buffering" content delivery or downloading data in advance. This is commonly achieved using a playback buffer. However, buffering, as currently implemented in most streaming service applications, is only intended to cover brief interruptions or interference of service (usually 30-60 seconds), such as when a mobile device is "handed off" from one tower to another, when going through a short tunnel, when available bandwidth is momentarily reduced due to network congestion, or under similar brief conditions. Once the mobile device leaves a problem zone, a buffer manager replenishes the buffer to a minimum level by varying the rate of transmission from the server as necessary. Nevertheless, this type of buffering is unsuitable when driving through areas with very large problem zones where the mobile device may be located for extended periods of time.

Another scenario for additional buffering may be where a network carrier wishes to minimize the use of a roaming partner's network to avoid paying data roaming costs. For example, if network operator A and network operator B have reciprocal roaming agreements, it still may be financially advantageous for network operator A to have their customers pre-fetch a large quantity of data from streaming services before roaming onto network operator B's network so that network operator A does not have to pay roaming data charges to network operator B.

Accordingly, there is a need for a system that uses specific knowledge about network conditions to prompt actions for mobile devices prior to encountering problem zones.

SUMMARY OF THE INVENTION

To overcome the limitations described above, and to overcome other limitations that will become apparent upon reading and understanding the present specification, embodiments initiating actions for mobile devices prior to a mobile user entering problem zones are disclosed.

The above described problems are solved by a system that enables network operators to provide network status information to streaming service providers such that the mobile device could take automated actions, for example as pre-fetching a sufficient quantity of data in advance to last through the problem zone. Currently streaming service providers lack network awareness of a user's route in order to provide adequate buffering in advance to last through problem areas. Further, wireless network carriers are usually well-aware of problem zone locations. By making such information available to streaming service providers, the mobile device could pre-fetch a sufficient quantity of data to last throughout the period of service unavailability. Thus, to the end-user it appears that there was no interruption of streaming services. Moreover, providing this information enables other actions to be performed prior to entering a problem zone. For example, these actions could include simply warning the user that they are entering a problem zone, informing a user who is on a telephone call that they are about to enter a problem zone within a few minutes so that the call can be concluded, auto-saving of cloud-based documents that are being edited, or other actions that might logically need to be taken prior to entering a problem zone.

An embodiment includes a method for using specific knowledge about network conditions to initiate an action before problem zones are encountered. The method includes identifying a position and a route of a user, accessing a database to retrieve data identifying problem zones in a communications network, comparing the position and route of the user to retrieve data identifying problem zones, determining when the user is approaching a problem zone and performing an action to compensate for unfavorable network conditions of the problem zone when the user enters the problem zone.

In another embodiment, a system for initiating an action for a mobile device prior to a mobile user entering a problem zone is disclosed. The system includes a network comprising a plurality of coverage areas, wherein at least one of the plurality of coverage areas comprises a problem zone, a database storing coverage map data, wherein the coverage map data includes identification of a location of the problem zone, a device for comparing a current position, a planned route and a calculated speed of a user to the location of the problem zone and, based on the comparison, determining a time period the user will be located in the problem zone and a server for initiating an action to compensate for the problem zone when the user enters the problem zone.

In another embodiment, a computer-readable storage medium including executable instructions which, when executed by a processor, initiates an action for a mobile device prior to a mobile user entering a problem zone is disclosed. The computer-readable storage medium includes instructions for identifying a position and a route of a user, accessing a database to retrieve data identifying problem zones in a communications network, comparing the position and route of the user to retrieve data identifying problem zones, determining when the user is approaching a problem zone and performing an action to compensate for unfavorable network conditions of the problem zone when the user enters the problem zone.

These and various other advantages and features of novelty are pointed out with particularity in the claims annexed hereto and form a part hereof. However, for a better understanding of the disclosed embodiments, the advantages, and the objects obtained, reference should be made to the drawings which form a further part hereof, and to accompanying descriptive matter, in which there are illustrated and described specific examples of the disclosed embodiments.

BRIEF DESCRIPTION OF THE DRAWINGS

Referring now to the drawings in which like reference numbers represent corresponding parts throughout:

FIGS. 5a-b illustrate a suitable mobile computing environment, for example, a mobile computing device, a smart phone, a tablet personal computer, a laptop computer, and the like, with which embodiments may be practiced.

DETAILED DESCRIPTION

Embodiments of the present invention are directed to using knowledge of problem zones, such as network dead zones, congestion areas, and roaming areas, to directly influence how streaming data is handled. Wireless network carriers are usually well-aware of problem zone locations. Knowledge of problem zone locations is used to initiate actions on a mobile device or within a network to prepare for the impending entry of a mobile device into a problem zone. Embodiments provide intelligent buffering or pre-fetching specific amounts of additional media, map, or other sorts of data based on an expected period of time in a problem zone. This includes calculating how far in advance of a problem zone the additional pre-fetching of data needs to begin based on known data throughput parameters near the edge of the network. In addition to compensating for data delivery while the user is in the problem area, the network may send notifications to the user. Notifications may be an indication that the network will be buffering a predetermined amount of data that will be used during the time the user is in the problem area. Alternatively, a notification may simply inform the user that a problem zone will be encountered.

Thus, the streaming content providers may be able to use the problem zone compensation according to an embodiment to provide market differentiation. However, problem zone compensation according to embodiments described herein may be provided as an added value to network service. In such scenarios, the user may need to be registered with the network provider.

Figure 1:
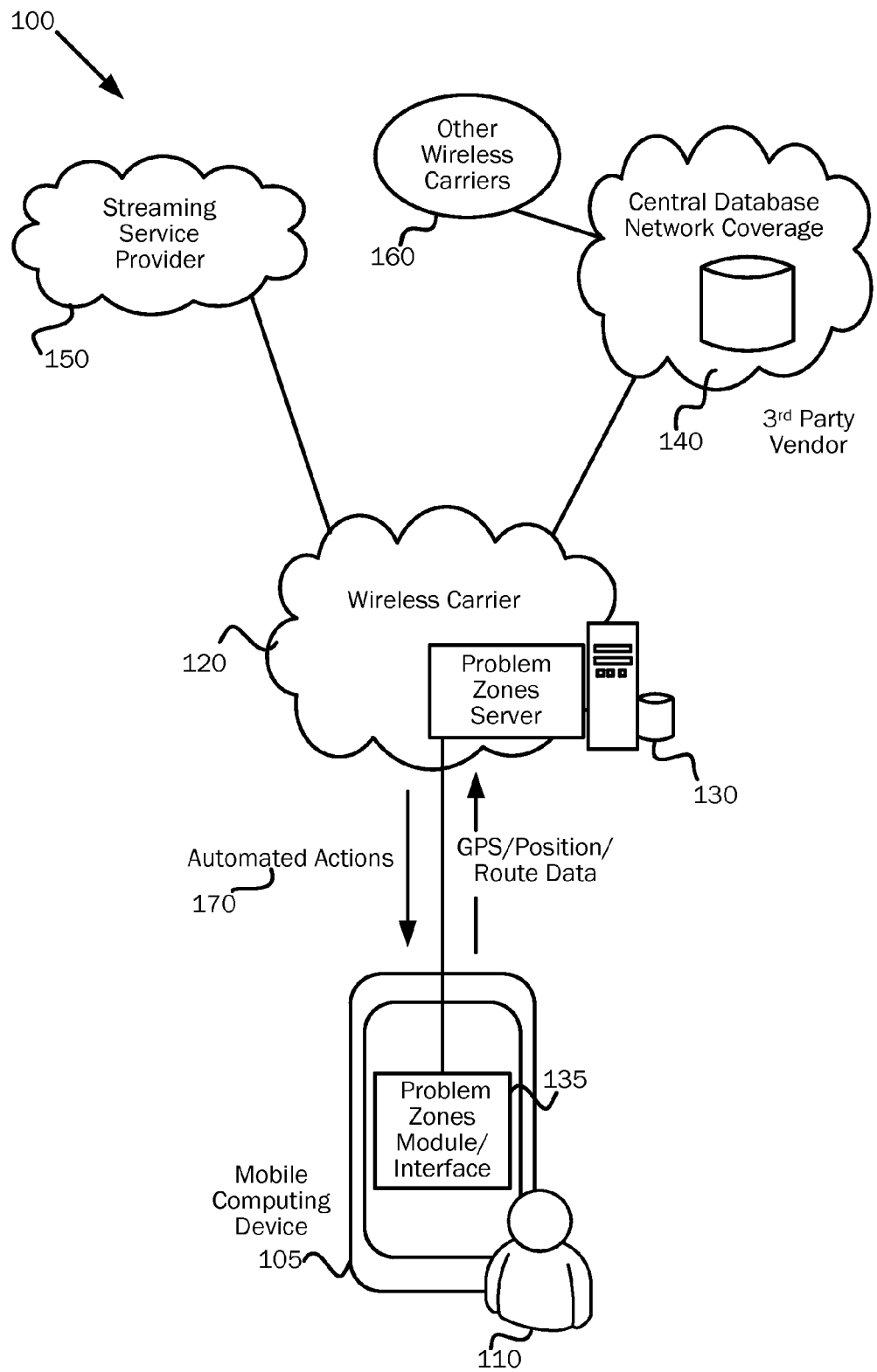
FIG. 1 illustrates a system that uses specific knowledge about network conditions to prompt action prior to encountering problem zones according to one embodiment.

FIG. 1 illustrates system 100 that uses specific knowledge about network conditions to prompt action prior to encountering problem zones according to one embodiment. Wireless network operators 120, as part of their usual network monitoring practices, are well aware of where problem zones are located, which areas in the network are heavily congested (average throughput during congested periods, what time of day is congested, etc.), and other similar network status information. They are also acutely aware of the location of roaming partner networks and the costs associated with usage of those networks. The system may process data from the user 110 and the problem zone information from the database (stores network data, geographic data) 130 to provide or initiate a predetermined action 170, for example, an estimate of data that needs to be buffered. Network operators 120 could provide problem zone information to streaming service providers 150 in a variety of scenarios such that the mobile device 105 could pre-fetch a sufficient quantity of data (or an automated action) in advance to last through the problem area. Those skilled in the art recognize that the network operator 120 and the streaming service provider 150 may be two distinct parties or the network operator 120 may offer a streaming media service or other similar services to their own customers. Further, the streaming service provider may retrieve information from a network operator-supplied computer server/database 130 that resides within its domain or from a third party vendor 140 that maintains central database of network coverage. As illustrated in FIG. 1 and according to one embodiment, the mobile device 105 may comprise a problem zones module 135 operable to identify the position and route of the mobile computing device, identify zones of unfavorable network conditions, determine if the device is approaching an identified zone, and initiate actions for a mobile device prior to entering the problem zone. Although the problem zones module 135 is illustrated as located locally on mobile computing device 105 in FIG. 1, according to other embodiments and as described in more detail with reference to FIG. 4, the problem zones module 135 may be located remotely in a network and accessed via a mobile computing device 105, wireless carrier 120, or streaming service provider 150. As will be described in more detail below, problem zones compensation may be utilized by a streaming services provider 150 or a wireless carrier 120.

In one scenario the network operator 120 identifies problem zones based on real-time queries of proposed routes. The network provider 120 may have a computer server/database 130 that the streaming provider 150 may query. A streaming content provider 150 may access a database 130 maintained by the network provider 120 to determine where the user is located, what path the user will be traveling and what type of service is provided in the path the user will be traveling, i.e., whether there are any upcoming problem zones. The particular user's location (or proposed route) could either be passed to network operator 120 or the operator could look up the user's current location using standard location-determining methods (tower triangulation, etc.).

As an example, a user has a mobile device 105 with both GPS services and streaming music services on a long car trip. As the user sets the route to his destination at the beginning of the trip, the device 105 sends the trip data to the wireless network provider 120 who then answers back that there is a 10 mile problem zone in the middle of the trip. The mobile device 105 then knows that when several miles from the problem zone that it should begin to buffer sufficient music to survive a 10 mile interruption. Based on knowledge of network conditions at the edge of the problem zone and expected speed through the problem zone, the streaming music app knows that 10 miles of problem zone would require 15 MB of music, and that it needs to begin the 15 MB download exactly 5 miles before the problem zone begins.

Similarly, the user may be a customer of network operator A 120 and their route of travel will take them through a 10-mile geographic area not served by operator A. In this area, their phone will roam onto network operator B's network 160 (with whom A has a roaming agreement). Although the user may not pay specifically for roaming data usage, operator A 120 does have to reimburse operator B 160 for data used by A's customers when roaming. As the user approaches the area served by operator B 160, the mobile device 105 will pre-fetch enough streaming data for the 10-mile roaming zone from A's network such that no data will be necessary when in B's area (and A doesn't have to pay B).

In a second scenario of implementation the network operator 120 could monitor the streaming service user's position in real-time and provide an asynchronous warning 170 to the device or to the streaming service provider 150 if the network operator 120 determined that the user appeared to be approaching a problem zone. For example, the user has a mobile device 105 with both location services (GPS, cell tower triangulation, etc.) and video services which are being watched by children in the car (default video buffer is 1 minute). As the driver leaves their suburban home (less network congestion) and drives towards the city (more network congestion), carrier 120 is automatically checking the location of device 105 on a frequent basis. As the driver nears the city, operator 120 will initiate a warning to device 105 that it's nearing an area of congestion expected to last a determine period, e.g., 10 minutes, and therefore the mobile device 105 increases the normal buffer size to accommodate the period of congestion, e.g., the normal buffer may be increased from 1 minute to greater than 10 minutes of video.

Thirdly, the network operator 120 could monitor the position of users making voice telephone calls in real-time and provide an in-call voice warning 170 if the network operator determined that the user appeared to be approaching a problem zone. This could be done within the operator's network alone with no special software needed on the device itself. So if a user is using their mobile phone 105 to have a voice conversation while driving, the network operator may determine that there will be reduced network coverage within two miles at the current rate of speed. The voice call is briefly interrupted with the warning "reduced wireless coverage in 1 mile".

A fourth implementation scenario is the network operator 120 could publish data on problem zones in various forms and supply it to either users 110 or to streaming service providers 150 such that a user's current position could be compared to known problem zones and appropriate actions taken when needed. Obviously, network providers would need to update this data at frequent intervals as network characteristics changed. An example of pre-published problem zone data for use by streaming service providers is as follows: Network operator 120 makes "problem zone" location data available to a GPS navigation company 150 that uses real-time map streaming for mobile devices (i.e. maps not stored on device but in the network). As the user is driving with their mobile device 105 and using the GPS feature, the navigation company is constantly sending updated road and traffic maps to the user. When approaching a problem zone, the navigation company knows exactly where the problem zone is and starts sending additional detailed map data to the device in advance of the problem zone such that map coverage is assured throughout the entire problem zone.

Such additional items as expected rate of speed or time in the problem area could be used to determine exactly how much streaming data should be pre-fetched. Knowledge of network data speeds immediately prior to the problem areas could determine how far in advance the pre-fetch would need to occur.

Those skilled in the art will recognize that the location of the user may be monitored using a variety of different location methods. For example, most devices now have built-in GPS receivers that may provide direct GPS location services. In addition, network assisted GPS may be used where AGPS servers download orbital information that may then be provided to the GPS receiver on a user device, thereby enabling the GPS receiver to lock to the satellites more rapidly. Another example of a location method may involve cell tower triangulation to monitor a location of a user.

Figure 2:
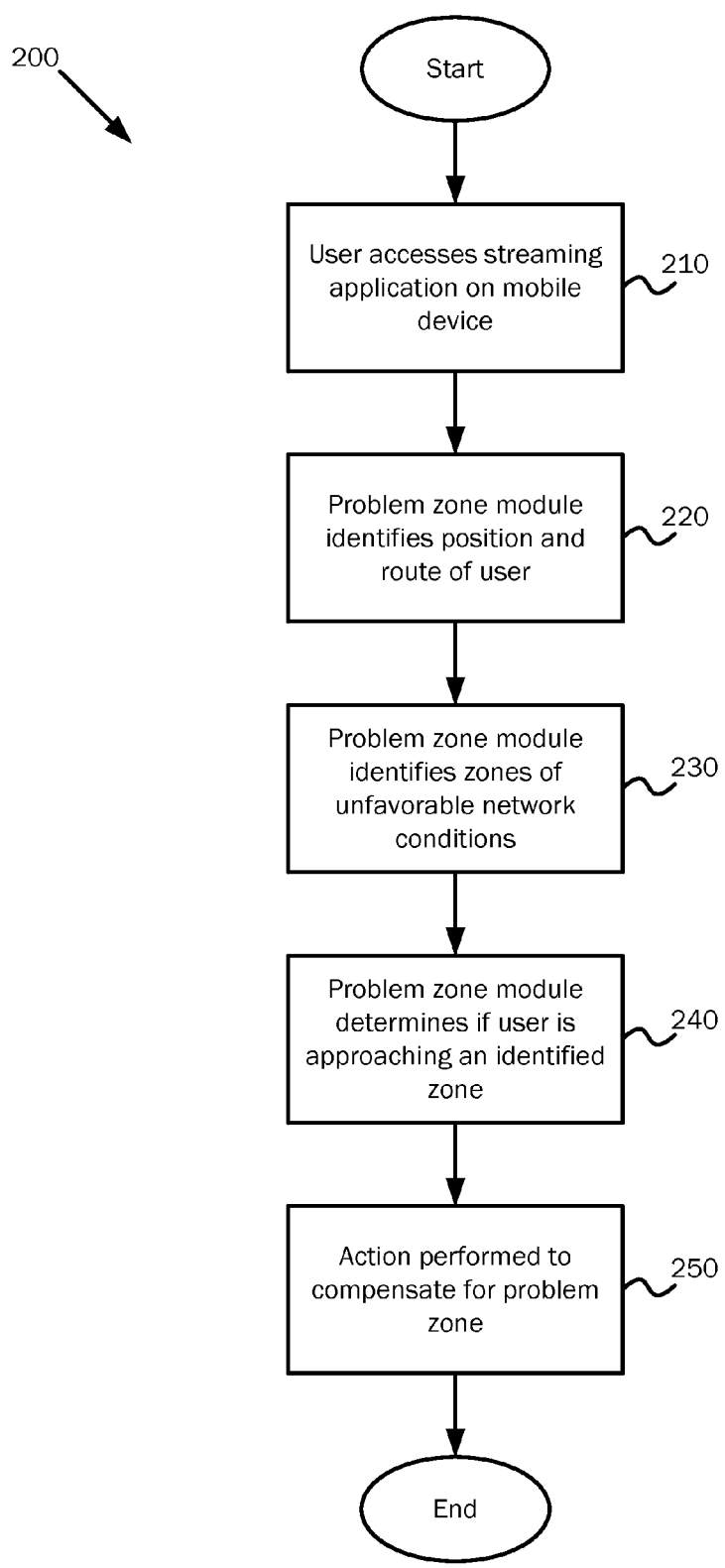
FIG. 2 illustrates a flow diagram of the high order process for automated actions to be taken by mobile devices prior to zones of reduced wireless coverage according to one embodiment.

FIG. 2 is a block diagram 200 of the high order process for automated actions to be taken by mobile devices prior to zones of reduced wireless coverage according to one embodiment. A user 110 accesses a streaming services application on the mobile computing device 105 that is network aware (210) since the problem zone module 135 accesses a database to identify zones of unfavorable network conditions (220). The problem zone module 135 may retrieve information from a network operator-supplied computer server/database 130 which may reside within its domain or may be provided by a third party 140. The problem zone module 135 identifies a position (or proposed route) of a user (230). The position and route of the user is compared to the identified zones of unfavorable network conditions (240) to determine that the user is approaching a problem zone. Automated actions 170 are initiated to compensate for unfavorable network conditions prior to entering the problem zone (250). The action taken 170 may include pre-fetching specific amounts of additional media, map, or other sorts of data based on expected period of time in a problem zone. Other actions may include audible or visual warnings to the user, reducing the data rate to a lower bit, auto-saving of cloud-based documents that are being edited, etc.

Figure 3:
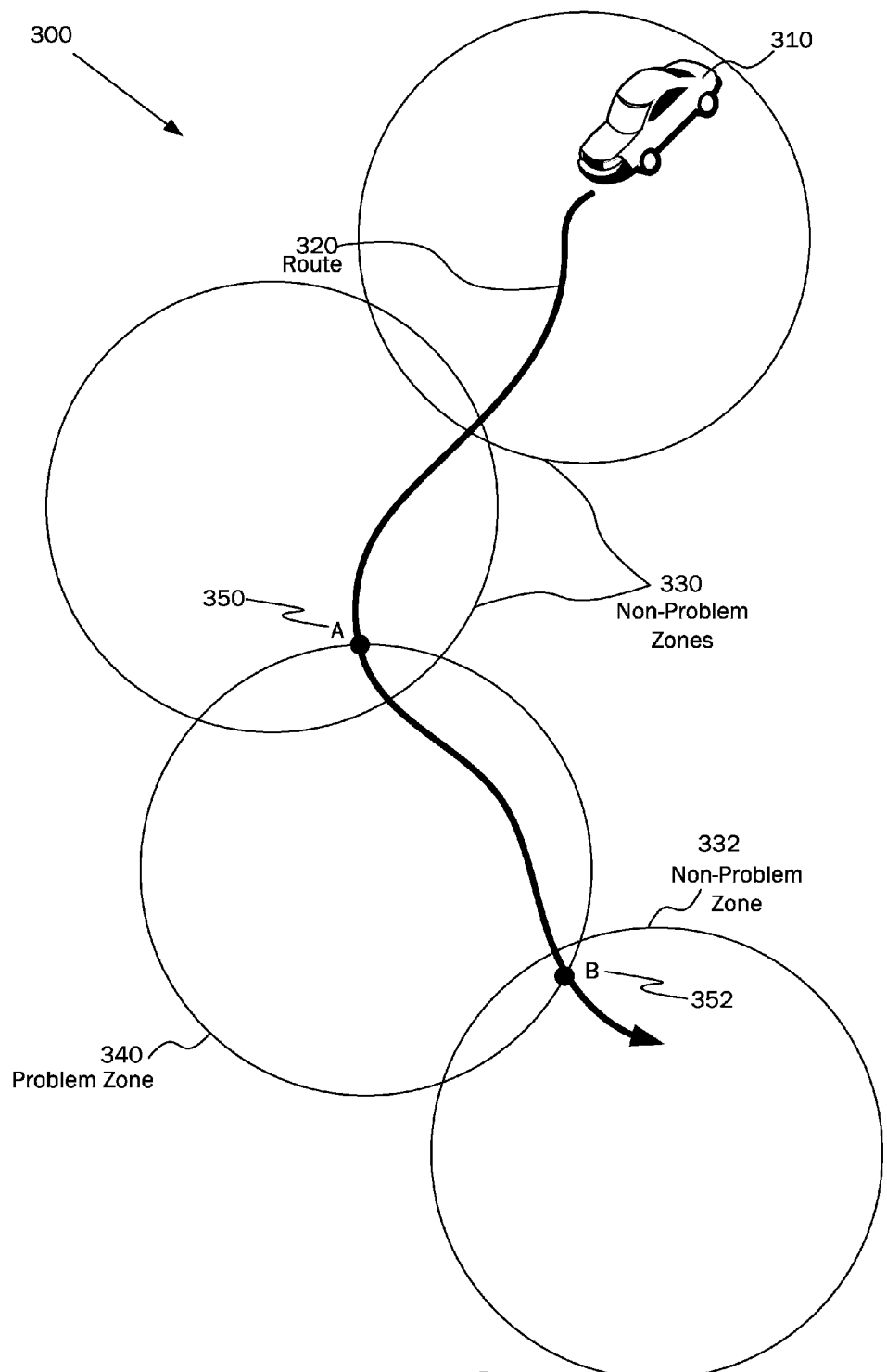
FIG. 3 illustrates a method for providing actions by mobile devices prior to mobile user entering problem zones according to an embodiment.

FIG. 3 illustrates a method 300 for providing actions by mobile devices prior to mobile user entering problem zones according to an embodiment. In FIG. 3, a user of a mobile device (not shown) is in an automobile 310 that is traveling along a pre-planned route 320. The route is covered by a mobile communications system that is represented by cells 330, 332 and 340. Cells 330, 332 represent cells that are not problem zones, i.e., areas of favorable network conditions. In cells 330, 332, streaming data can be assumed to be received by the user in automobile 310 without significant interruption or interference. As mentioned above, a common buffering methodology may be used to compensate for minor problems in data reception.

However, cell 340 is a known problem zone. Thus, the user in automobile 310 will experience a substantial disruption in service while in problem zone cell 340 from point A 350 to point B 352 along route 320. As such, the common buffering methodology used to compensate for minor problems in data reception, cannot provide continuous delivery of data and therefore a significant portion of any streamed data will be lost. Those skilled in the art will recognize that data reception is only one parameter for which the embodiments described herein may compensate. For example, as described above, problem zone 340 may only represent a roaming area serviced by another carrier.

Figure 4:
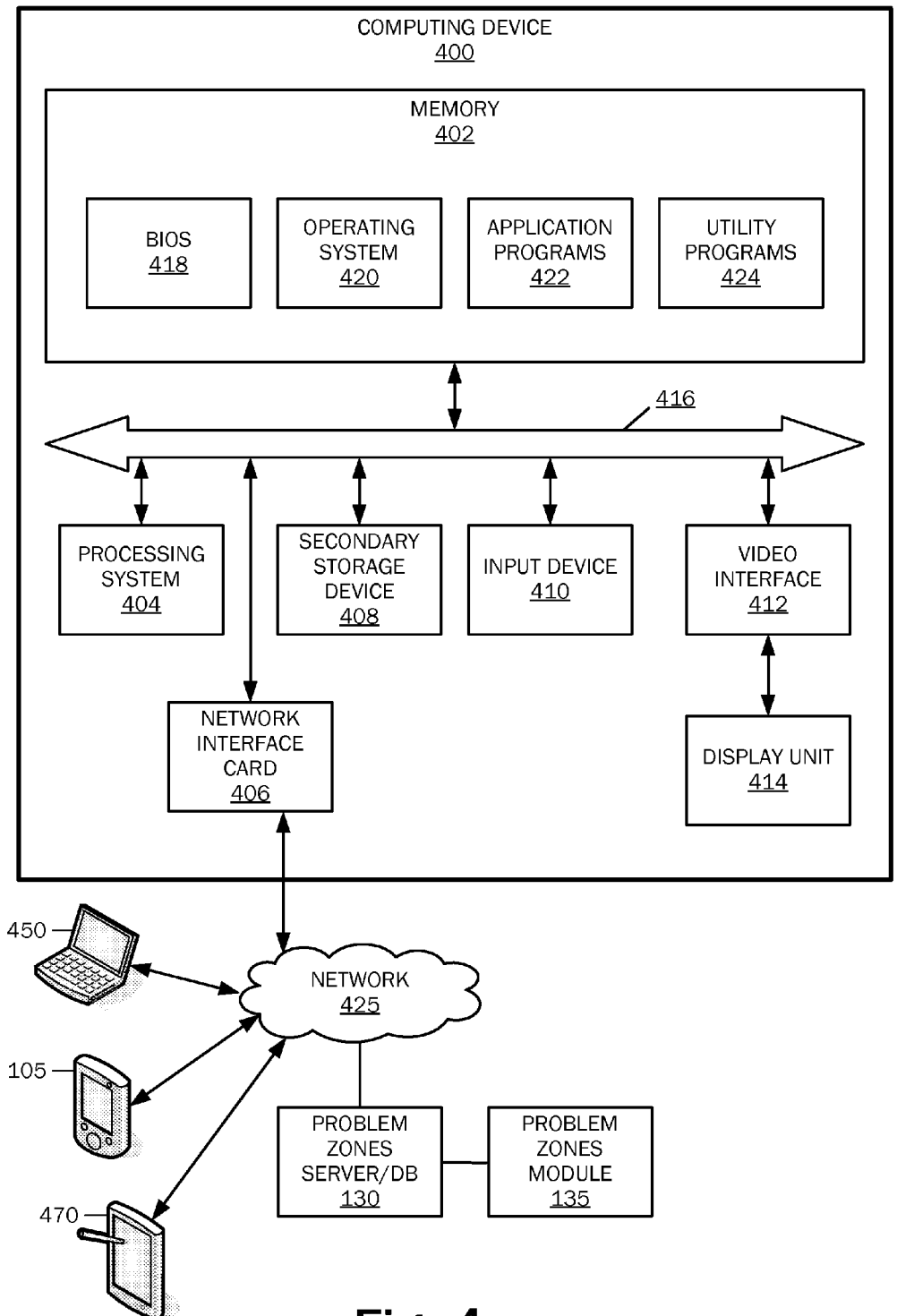
FIG. 4 is a block diagram illustrating example physical components of a computing device and a system architecture for providing automated actions by mobile devices prior to zones of reduced wireless coverage.

Therefore, prior to reaching point A 350, sufficient data must be transmitted to the mobile device 105 of the user 110 in automobile 310 to allow continuous, uninterrupted data consumption until the automobile 310 reaches at least point B 352. By comparing the route 320 to the coverage map data along the route, i.e., non-problem zones 330, 332 and problem zone 340, the service may determine the average speed of the automobile 310, whether the average speed may be maintained from point A 350 to point B 352, and an amount of data that must be buffered by the mobile device of the user in automobile 310 to last until the automobile 310 reaches the non-problem zone 332. FIG. 4 is a block diagram illustrating example physical components of a computing device 400 for initiating actions for mobile devices 105 prior to a mobile user 110 entering problem zones according to an embodiment. In some embodiments, the problem zones server 130, the streaming service 140, and/or the central database of network coverage 140 may be implemented using one or more computing devices like the computing device 400. It should be appreciated that in other embodiments, the problem zones server 130, the streaming service 140, and/or the central database of network coverage 140 may be implemented using computing devices having hardware components other than those illustrated in the example of FIG. 4.

Computing devices may be implemented in different ways in different embodiments. For instance, in the example of FIG. 4, the computing device includes a processing system 404, memory 402, a network interface 406, a secondary storage device 408, an input device 410, a video interface 412, a display unit 414, and a communication medium 416. In other embodiments, the computing device 400 may be implemented using more or fewer hardware components (e.g., a video interface, a display unit, or an input device) or in combination with other types of computer systems and program modules.

The memory 402 includes one or more computer-readable storage media capable of storing data and/or computer-executable instructions. According to one embodiment, the problem zones module 135 may be stored locally on computing device 400. Memory 402 thus may store the computer-executable instructions that, when executed by processor 404, cause the problem zones module 135 to identify the position of a mobile computing device 105, identify zones of unfavorable network conditions, determine if the device is approaching an identified zone, and initiate actions for a mobile device 105 prior to a mobile user 110 entering the problem zone as described above with reference to FIGS. 1-3.

In various embodiments, the memory 402 is implemented in various ways. For example, the memory 402 can be implemented as various types of computer-readable storage media. Example types of computer-readable storage media include, but are not limited to, solid state memory, flash memory, dynamic random access memory (DRAM), double data rate synchronous dynamic random access memory (DDR SDRAM), DDR2 SDRAM, DDR3 SDRAM, read-only memory (ROM), reduced latency DRAM, electrically-erasable programmable ROM (EEPROM), and other types of devices and/or articles of manufacture that store data.

According to embodiments, the term computer-readable media includes communication media and computer-readable storage media. Communication media include information delivery media. Computer-executable instructions, data structures, program modules, or other data in a modulated data signal, such as a carrier wave or other transport mechanism, may be embodied on a communications medium. The term modulated data signal describes a signal that has one or more characteristics set or changed in such a manner as to encode information in the signal. For example, communication media can include wired media, such as a wired network or direct-wired connection, and wireless media, such as acoustic, radio frequency (RF), infrared, and other wireless media.

The term computer-readable storage medium may also refer to devices or articles of manufacture that store data and/or computer-executable instructions readable by a computing device. The term computer-readable storage media encompasses volatile and nonvolatile, removable and non-removable media implemented in various methods or technologies for storage and retrieval of information. Such information can include data structures, program modules, computer-executable instructions, or other data.

The processing system 404 includes one or more processing units, which may include tangible integrated circuits that selectively execute computer-executable instructions. In various embodiments, the processing units in the processing system 404 are implemented in various ways. For example, the processing units in the processing system 404 can be implemented as one or more processing cores. In this example, the processing system 404 can comprise one or more Intel Core microprocessors. In another example, the processing system 404 can comprise one or more separate microprocessors. In yet another example embodiment, the processing system 404 can comprise Application-Specific Integrated Circuits (ASICs) that provide specific functionality. In yet another example, the processing system 404 provides specific functionality by using an ASIC and by executing computer-executable instructions.

The computing device 400 may be enabled to send data to and receive data from a communication network via a network interface card 406. In different embodiments, the network interface card 406 is implemented in different ways, such as an Ethernet interface, a token-ring network interface, a fiber optic network interface, a wireless network interface (e.g., Wi-Fi, Wi-Max, etc.), or another type of network interface. The network interface may allow the device to communicate with other devices, such as over a wireless network in a distributed computing environment, a satellite link, a cellular link, and comparable mechanisms. Other devices may include computer device(s) that execute communication applications, storage servers, and comparable devices.

The secondary storage device 408 includes one or more computer-readable storage media, and may store data and computer-executable instructions not directly accessible by the processing system 404. That is, the processing system 404 performs an I/O operation to retrieve data and/or computer-executable instructions from the secondary storage device 408. In various embodiments, the secondary storage device 408 can be implemented as various types of computer-readable storage media, such as by one or more magnetic disks, magnetic tape drives, CD-ROM discs, DVD-ROM discs, BLU-RAY discs, solid state memory devices, and/or other types of computer-readable storage media.

The input device 410 enables the computing device 400 to receive input from a user. Example types of input devices include, but are not limited to, keyboards, mice, trackballs, stylus input devices, key pads, microphones, joysticks, touch-sensitive display screens, and other types of devices that provide user input to the computing device 400.

The video interface 412 outputs video information to the display unit 414. In different embodiments, the video interface 412 is implemented in different ways. For example, the video interface 412 is a video expansion card. In another example, the video interface 412 is integrated into a motherboard of the computing device 400. In various embodiments, the display unit 414 can be a an LCD display panel, a touch-sensitive display panel, an LED screen, a projector, a cathode-ray tube display, or another type of display unit. In various embodiments, the video interface 412 communicates with the display unit 414 in various ways. For example, the video interface 412 can communicate with the display unit 414 via a Universal Serial Bus (USB) connector, a VGA connector, a digital visual interface (DVI) connector, an S-Video connector, a High-Definition Multimedia Interface (HDMI) interface, a DisplayPort connector, or another type of connection.

The communications medium 416 facilitates communication among the hardware components of the computing device 400. In different embodiments, the communications medium 416 facilitates communication among different components of the computing device 400. For instance, in the example of FIG. 4, the communications medium 416 facilitates communication among the memory 402, the processing system 404, the network interface card 406, the secondary storage device 408, the input device 410, and the video interface 412. In different embodiments, the communications medium 416 is implemented in different ways, such as a PCI bus, a PCI Express bus, an accelerated graphics port (AGP) bus, an Infiniband interconnect, a serial Advanced Technology Attachment (ATA) interconnect, a parallel ATA interconnect, a Fiber Channel interconnect, a USB bus, a Small Computing system Interface (SCSI) interface, or another type of communications medium.

The memory 402 stores various types of data and/or software instructions. For instance, in the example of FIG. 4, the memory 402 stores a Basic Input/Output System (BIOS) 418, and an operating system 420. The BIOS 418 includes a set of software instructions that, when executed by the processing system 404, cause the computing device 400 to boot up. The operating system 420 includes a set of software instructions that, when executed by the processing system 404, cause the computing device 400 to provide an operating system that coordinates the activities and sharing of resources of the computing device 400. The memory 402 also stores one or more application programs 422 that, when executed by the processing system 404, cause the computing device 400 to provide applications to users, for example, streaming applications and problem zones module 135. The memory 402 also stores one or more utility programs 424 that, when executed by the processing system 404, cause the computing device 400 to provide utilities to other software programs.

Embodiments of the present invention may be utilized in various distributed computing environments where tasks are performed by remote processing devices that are linked through a communications network in a distributed computing environment.

Moreover, embodiments may be implemented such that each or many of the components illustrated in FIG. 4 may be integrated onto a single integrated circuit. When operating via such a single integrated circuit, the functionality, described herein, with respect to the problem zones module 135 may be operated via application-specific logic integrated with other components of the computing device/system 400 on the single integrated circuit.

The problem zones server 130 may provide problem zone information to client devices. As one example, server 130 may be a web server providing the problem zones module 135 over the web. Server 130 may provide the problem zones module over the web to clients through a network 425. Examples of clients that may obtain the problem zones module 135 include computing device 450, which may include any general purpose personal computer (such as computing device 400), a tablet computing device 470 and/or mobile computing device 105, such as smart phones.

FIGS. 5A and 5B illustrate a suitable mobile computing environment for initiating actions for mobile devices prior to a mobile user entering problem zones according to an embodiment. Such mobile computing environments may include, for example, a mobile computing device 105, a smart phone, a tablet personal computer 470, a laptop computer, machine-to-machine (M2M) wireless communication module, and the like, with which embodiments may be practiced. The mobile computing device 105 is illustrative of any suitable device operative to send, receive and process wireless communications according to embodiments of the present invention. A display screen 505 is operative for displaying a variety of information such as information about incoming and outgoing communications, as well as, a variety of data and displayable objects, for example, text, alphanumeric data, photographs, and the like.

Data input to the device 105 may be performed via a variety of suitable means, such as, touch screen input via the display screen 505, keyboard or keypad input via a data entry area 510, key input via one or more selectable buttons or controls 515, voice input via a microphone 520 disposed on the device 105, photographic input via a camera 525 functionality associated with the mobile computing device, or any other suitable input means. Data may be output via the device 105 via any suitable output means, including but not limited to, display on the display screen 505, audible output via an associated speaker 530 or connected earphone system, vibration module for providing tactile output, and the like.

Operational unit 535 is illustrative of internal operating functionality of the mobile computing device 105. A processor 540 is illustrative of a general purpose computer processor for processing incoming and outgoing data and communications and controlling operation of the device and associated software applications via a mobile computing device operating system. Memory 545 may be utilized for storing a device operating system, device programming, one or more stored applications, for example, mobile telephone applications, data processing applications, calculators, games, Internet browsing applications, navigation applications, acceleration applications, camera and/or video applications, etc. According to one embodiment, the problem zones module 135 may be stored locally on mobile computing device 105.

Mobile computing device 105 may contain an accelerometer 555 for detecting acceleration, and can be used to sense orientation, vibration, and/or shock. Mobile computing device 105 may contain a global positioning system (GPS) system (e.g., GPS send/receive functionality) 560. A GPS system 560 uses radio waves to communicate with satellites orbiting the Earth. Some GPS-enabled mobile computing devices use wireless-assisted GPS to determine a user's location, wherein the device uses orbiting GPS satellites in conjunction with information about the device's mobile phone signal. Radio functions 550 include all required functionality, including onboard antennae, for allowing the device 105 to communicate with other communication devices and systems via a wireless network. Radio functions 550 may be utilized to communicate with a wireless or WIFI-based positioning system to determine a device's 105 location.

Although described herein in combination with mobile computing device 105, in alternative embodiments the invention may be used in combination with any number of computer systems, such as in desktop environments, laptop or notebook computer systems, multiprocessor systems, microprocessor based or programmable consumer electronics, networked PCs, mini computers, main frame computers and the like. Embodiments of the present invention may be utilized in various distributed computing environments where tasks are performed by remote processing devices that are linked through a communications network in a distributed computing environment, and where programs may be located in both local and remote memory storage.

Embodiments, for example, are described above with reference to block diagrams and/or operational illustrations of methods, systems, and computer program products according to embodiments. The functions/acts noted in the blocks may occur out of the order as shown in any flowchart or described herein with reference to FIGS. 1-3. For example, two processes shown or described in succession may in fact be executed substantially concurrently or the blocks may sometimes be executed in the reverse order, depending upon the functionality/acts involved.

While certain embodiments have been described, other embodiments may exist. Furthermore, although embodiments have been described as being associated with data stored in memory and other storage mediums, data can also be stored on or read from other types of computer-readable storage media, such as secondary storage devices, like hard disks, floppy disks, a CD-ROM, or other forms of RAM or ROM. Further, the disclosed processes may be modified in any manner, including by reordering and/or inserting or deleting a step or process, without departing from the embodiments.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method implemented by a mobile device for using specific knowledge about network conditions to initiate an action before problem zones are encountered, comprising:
   identifying a position and a route of a user;
   accessing a database to retrieve data identifying problem zones in a communications network, the problem zones including areas with network congestion and areas only serviced by another communications network operator;
   comparing the position and route of the user to retrieve data identifying problem zones;
   determining when the user is approaching a problem zone representing a roaming area serviced by the other communications network operator;
   in response to determining the user is approaching the problem zone representing the roaming area serviced by the other communications network operator, determining an expected period of time that the user will be in the problem zone based on the position, the route of the user, a speed of the user, and a distance of the problem zone, and the user receiving a notice prior to entering the problem zone that the user will be encountering the problem zone wherein the notice indicates to the user that a predetermined amount of data will be buffered prior to entering the problem zone that corresponds with the expected period of time the user will be in the problem zone; and
   in response to determining an expected period of time that the user will be in the problem zone representing the roaming area serviced by the other communications network operator, compensating for unfavorable network conditions of the problem zone for the expected period of time when the user enters the problem zone and negating the necessity for data from the other communications network provider while in the roaming area serviced by the other communications network operator.

2. The method of claim 1, wherein the compensating for unfavorable network conditions of the problem zone comprises the mobile device pre-fetching a sufficient quantity of data for consumption by the user while in the problem zone.

3. The method of claim 2, wherein the pre-fetching a sufficient quantity of data for consumption by the user while in the problem zone comprises pre-fetching media data based on an expected period of time the user will be in the problem zone.

4. The method of claim 2, wherein the pre-fetching a sufficient quantity of data for consumption by the user while in the problem zone comprises pre-fetching map data based on an expected period of time the user will be in the problem zone.

5. The method of claim 1, wherein the compensating for unfavorable network conditions of the problem zone comprises providing an in-call voice warning in response to determining the user is approaching a problem zone.

6. The method of claim 1, wherein the compensating for unfavorable network conditions of the problem zone comprises auto-saving cloud-based documents being edited by the user prior to reaching the problem zone.

7. The method of claim 1, wherein the accessing a database to retrieve data identifying problem zones in a communications network comprises accessing a database of a network operator.

8. A system for initiating an action for a mobile device prior to a mobile user entering a problem zone, comprising:
   a network and a plurality of coverage areas, wherein at least one of the plurality of coverage areas comprises a problem zone representing a roaming area serviced by another network;
   a database storing coverage map data, wherein the coverage map data includes identification of a location of the problem zone representing the roaming area serviced by the other network;
   a device for comparing a current position, a planned route and a calculated speed of a user to the location of the problem zone and, based on the comparison and determining the user is approaching the problem zone representing the roaming area serviced by the other network, determining a time period the user will be located in the problem zone representing the roaming area serviced by the other network; and
   a server for initiating an action in response to determining the user is approaching the problem zone to compensate for the problem zone for the expected period of time when the user enters the problem zone representing the roaming area serviced by the other network and for negating the necessity for data from the other communications network provider while in the roaming area serviced by the other network, and in response to determining the user is approaching the problem zone representing the roaming area serviced by the other communications network operator, the server sends a notice to the user prior to the user entering the problem zone that the user will be encountering the problem zone wherein the notice indicates to the user that a predetermined amount of data will be buffered prior to the user entering the problem zone that corresponds with the time period the user will be in the problem zone.

9. The system of claim 8, wherein the database is provided by a first network operator maintaining the network.

10. The system of claim 9, wherein a streaming service provider accesses the database provided by the first network operator.

11. The system of claim 8, wherein the device further accessing the database to obtain the identification of the location of the problem zone, identifying a current position of a user within the network, identifying a planned route of the user, and determining a speed of the user along the planned route.

12. The system of claim 8, wherein the server initiates the action to compensate for the problem zone by pre-fetching a sufficient quantity of data for consumption by the user while in the problem zone.

13. The system of claim 12, wherein the data pre-fetched by the server comprises media data.

14. The system of claim 12, wherein the data pre-fetched by the server comprises map data.

15. The system of claim 8, wherein the server initiates the action to compensate for the problem zone by providing an in-call voice warning upon determining the user is approaching a problem zone.

16. The system of claim 8, wherein the server initiates the action to compensate for the problem zone by auto-saving cloud-based documents being edited by the user prior to reaching the problem zone.

17. The system of claim 8, wherein the device obtains current location of a user using standard location-determining methods.

18. A non-transitory computer-readable storage medium including executable instructions which, when executed by a processor, initiates an action for a mobile device prior to a mobile user entering a problem zone, by:
   identifying a position and a route of a user;
   accessing a database to retrieve data identifying problem zones in a communications network, the problem zones including areas with network congestion and areas only serviced by another communications network operator;
   comparing the position and route of the user to the retrieve data identifying problem zones;
   determining when the user is approaching a problem zone representing a roaming area serviced by another communications network operator;
   in response to determining the user is approaching the problem zone representing the roaming area serviced by the other communications network operator, determining an expected period of time that the user will be in the problem zone based on the position of the user, the route of the user, a speed and a distance of the problem zone, and the user receiving a notice prior to entering the problem zone that the user will be encountering the problem zone wherein the notice indicates to the user that a predetermined amount of data will be buffered prior to the user entering the problem zone that corresponds with the expected period of time the user will be in the problem zone; and
   in response to determining an expected period of time that the user will be in the problem zone representing the roaming area serviced by the other communications network operator, compensating for unfavorable network conditions of the problem zone for the expected period of time when the user enters the problem zone and negating the necessity for data from the other communications network provider while in the roaming area serviced by the other communications network operator.

19. The method of claim 5, further comprising the user being on a telephone call while then receiving the in-call voice warning upon determining the user is approaching a problem zone, wherein the in-call voice warning is received prior to the user entering the problem zone so that the mobile device may receive a sufficient quantity of data for consumption by the user while in the problem zone.

* * * * *